United States Patent
Standifird et al.

(10) Patent No.: US 11,287,788 B2
(45) Date of Patent: Mar. 29, 2022

(54) FIELD DEVELOPMENT OPTIMIZATION THROUGH DIRECT RIG EQUIPMENT CONTROL

(71) Applicant: Halliburton Energy Services, Inc., Houston, TX (US)

(72) Inventors: William Bradley Standifird, Fulshear, TX (US); Garrett Cade Guidry, Houston, TX (US); Mark Allen Woodmansee, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 353 days.

(21) Appl. No.: 16/599,979

(22) Filed: Oct. 11, 2019

(65) Prior Publication Data

US 2020/0409328 A1    Dec. 31, 2020

Related U.S. Application Data

(60) Provisional application No. 62/867,603, filed on Jun. 27, 2019.

(51) Int. Cl.
*G01V 99/00* (2009.01)
*E21B 49/00* (2006.01)
(Continued)

(52) U.S. Cl.
CPC ............ *G05B 19/0426* (2013.01); *G06F 8/65* (2013.01); *G05B 2219/23008* (2013.01); *G05B 2219/23258* (2013.01)

(58) Field of Classification Search
CPC ........ G06F 30/20; G06F 8/65; E21B 41/0092; E21B 49/00; E21B 43/00; E21B 43/14;
(Continued)

(56) References Cited

U.S. PATENT DOCUMENTS 8,306,842 B2   11/2012   Rahi et al.
9,328,573 B2   5/2016   Standifird et al.
(Continued)

FOREIGN PATENT DOCUMENTS

JP   2002163387   6/2002
WO   2013115766   8/2013

OTHER PUBLICATIONS

Liu Chun, Research on the application of the large-system theory in the production arrangement of oil fields, 4 pages (Year: 2011).*
(Continued)

*Primary Examiner* — Thuy Dao
(74) *Attorney, Agent, or Firm* — Thomas Rooney; C. Tumey Law Group PLLC

(57) ABSTRACT

A method comprising inputting a field development plan into a human interface, transferring the field development plan to an information handling system, transferring on or more electronic inputs into the information handling system, running a software program on the information handling system that integrates the electronic inputs with the field development plan to produce an output, sending the output to one or more pieces of equipment, operating the one or more pieces of equipment based at least in part on the output, measuring the operation of the one or more pieces of equipment with one or more sensors, sending the measurements from the one or more sensors back to the information handling system, running the software program with the measurements, updating the output based at least in part on the measurements and the field development plan, and sending an updated output to the one or more pieces of equipment.

9 Claims, 3 Drawing Sheets

(51) Int. Cl.
*E21B 41/00* (2006.01)
*G06G 7/48* (2006.01)
*E21B 7/04* (2006.01)
*G05B 19/042* (2006.01)
*G06F 8/65* (2018.01)

(58) Field of Classification Search
CPC ........ E21B 43/305; E21B 43/20; E21B 43/16;
E21B 43/26; E21B 41/00; G01V 99/005;
G01V 1/288; B60R 3/007; B65F 3/00;
G05B 19/0426; G05B 2219/23008; G05B
2219/23258
See application file for complete search history.

(56) References Cited

U.S. PATENT DOCUMENTS

| | | |
|---|---|---|
| 9,689,207 B2 | 6/2017 | Shen et al. |
| 9,851,469 B2 * | 12/2017 | Embid Droz ............ E21B 43/00 |
| 2012/0016649 A1 | 1/2012 | Thambynayagam et al. |
| 2014/0236681 A1 | 8/2014 | Ranjan et al. |
| 2015/0331971 A1 * | 11/2015 | Scollard ................ E21B 43/305 703/1 |
| 2018/0359339 A1 | 12/2018 | Zheng et al. |

OTHER PUBLICATIONS

International Search Report and Written Opinion for Application No. PCT/US2019/059279, dated Mar. 27, 2020.

* cited by examiner

FIELD DEVELOPMENT OPTIMIZATION THROUGH DIRECT RIG EQUIPMENT CONTROL

BACKGROUND

In the drilling of wellbores for hydrocarbon exploration and production, a field development plan may be implemented to increase productivity and reduce cost during development of an oil field. An oil field may include any number of well sites, which may be performing any type of suitable well site operation. Field development plans are often hindered by the scarcity and speed of information flowing form individual well sites back to a field development specialist and field scale computer models. These impairments result in sub-optimized decisions and economically impact the development of the field as condition changes and decisions at various well site operations frequently work against each other to prevent the most effect use of available resources for the development of the field. A system is needed to fully optimize the field development, making optimal use of information and available resources to empower the field development specialist to make timely and optimized decisions from complex and time sensitive well site information. This system will change the decision-making process for field development from the traditionally reactive approach based on observations to a pro-active, scenario based strategic decision-making process that will optimize the field development in accordance with the desired economic outcomes of the developing firm or agency.

BRIEF DESCRIPTION OF THE DRAWINGS

These drawings illustrate certain aspects of some examples of the present disclosure and should not be used to limit or define the disclosure.

DETAILED DESCRIPTION

Figure 1:
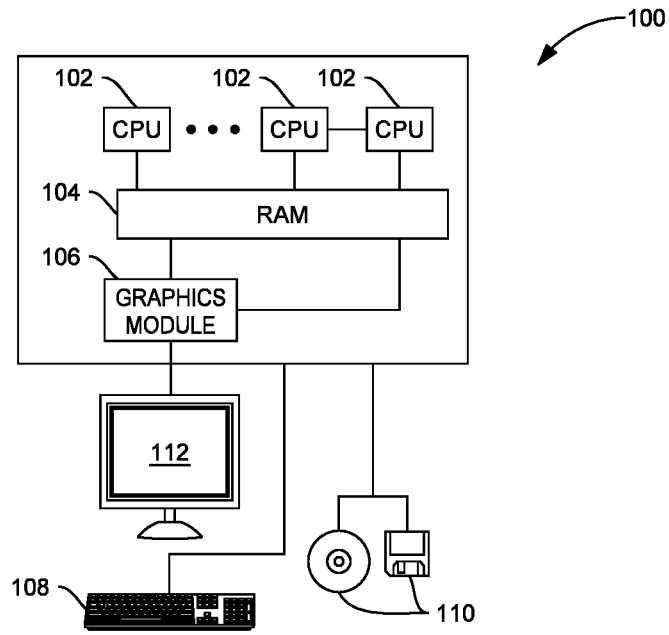
FIG. 1 illustrates an example of an information handling system.

Provided are systems and methods for improving field development design, well planning and well construction activities. Specifically, during field development, well construction providers across various disciplines make decisions appropriate to their scope of responsibility. The higher-level economic objectives for field development are isolated from the execution phase resulting in a sub-optimal field development economics due to decisions being made at the well scale versus the field scale. Relevant feedback from wellsite equipment must be distilled into relevant information and travel back across the disciplines in a timely manner in order to optimize field development and economic objectives.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following description, numerous details are set forth to provide an understanding of the present disclosure. However, it will be understood by those of ordinary skill in the art that the present disclosure may be practiced without these details and that numerous variations or modifications from the described embodiments may be possible. The disclosure will now be described with reference to the figures, in which like reference numerals refer to like, but not necessarily the same or identical, elements throughout. For purposes of clarity in illustrating the characteristics of the present disclosure, proportional relationships of the elements have not necessarily been maintained in the figures.

Specific examples pertaining to the method are provided for illustration only. The arrangement of steps in the process or the components in the system described in respect to an application may be varied in further embodiments in response to different conditions, modes, and requirements. In such further embodiments, steps may be carried out in a manner involving different graphical displays, queries, analyses thereof, and responses thereto, as well as to different collections of data. Moreover, the description that follows includes exemplary apparatuses, methods, techniques, and instruction sequences that embody techniques of the disclosed subject matter. It is understood, however, that the described embodiments may be practiced without these specific details or employing only portions thereof.

FIG. 1 generally illustrates an example of an information handling system 100. The information handling system 100 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 100 may be a personal computer, a network storage device, or any other suitable device and may vary in size, shape, performance, functionality, and price. In examples, information handling system 100 may be referred to as a supercomputer or a graphics supercomputer.

As illustrated, information handling system 100 may include one or more central processing units (CPU) or processors 102. Information handling system 100 may also include a random-access memory (RAM) 104 that may be accessed by processors 102. It should be noted information handling system 100 may further include hardware or software logic, ROM, and/or any other type of nonvolatile memory. Information handling system 100 may include one or more graphics modules 106 that may access RAM 104. Graphics modules 106 may execute the functions carried out by a Graphics Processing Module (not illustrated), using hardware (such as specialized graphics processors) or a combination of hardware and software. A user input device 108 may allow a user to control and input information to information handling system 100. Additional components of the information handling system 100 may include one or more disk drives, output devices 112, such as a video display, and one or more network ports for communication with external devices as well as a user input device 108 (e.g., keyboard, mouse, etc.). Information handling system 100 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media 110 such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 2:
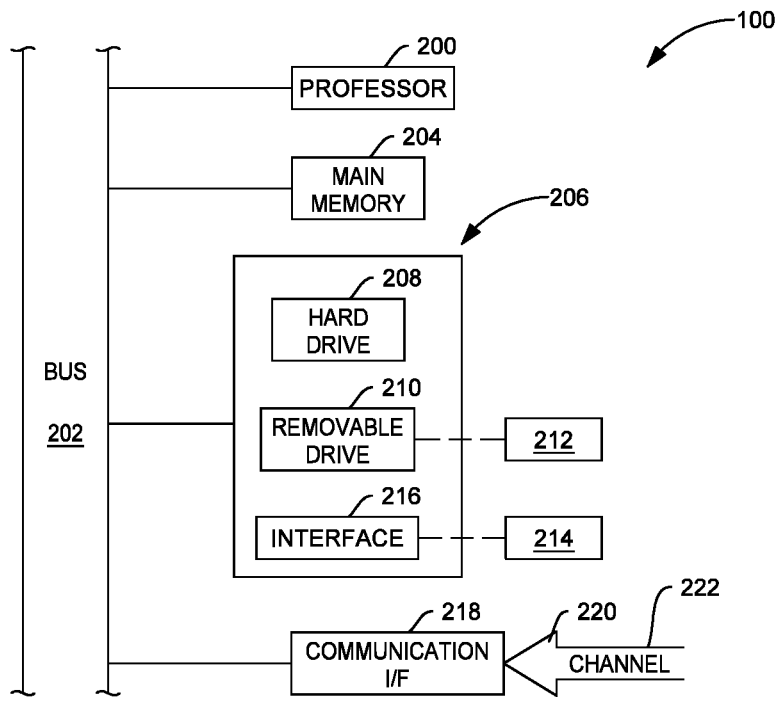
FIG. 2 illustrates another more detailed example of the information handling system.

FIG. 2 illustrates additional detail of information handling system 100. For example, information handling system 100 may include one or more processors, such as processor 200. Processor 200 may be connected to a communication interface 202. Various software embodiments are described in terms of this exemplary computer system. After reading this description, it will become apparent to a person skilled in the relevant art how to implement the example embodiments using other computer systems and/or computer architectures.

Information handling system 100 may also include a main memory 204, preferably random-access memory (RAM), and may also include a secondary memory 206. Secondary memory 206 may include, for example, a hard disk drive 208 and/or a removable storage drive 210, representing a floppy disk drive, a magnetic tape drive, an optical disk drive, etc. Removable storage drive 210 may read from and/or writes to a removable storage unit 212 in any suitable manner. Removable storage unit 212, represents a floppy disk, magnetic tape, optical disk, etc. which is read by and written to by removable storage drive 210. As will be appreciated, removable storage unit 212 includes a computer usable storage medium having stored therein computer software and/or data.

In alternative embodiments, secondary memory 206 may include other operations for allowing computer programs or other instructions to be loaded into information handling system 100. For example, a removable storage unit 214 and an interface 216. Examples of such may include a program cartridge and cartridge interface (such as that found in video game devices), a removable memory chip (such as an EPROM, or PROM) and associated socket, and other removable storage units 214 and interfaces 216 which may allow software and data to be transferred from removable storage unit 214 to information handling system 100.

In examples, information handling system 100 may also include a communications interface 218. Communications interface 218 may allow software and data to be transferred between information handling system 100 and external devices. Examples of communications interface 218 may include a modem, a network interface (such as an Ethernet card), a communications port, a PCMCIA slot and card, etc. Software and data transferred via communications interface 218 are in the form of signals 220 that may be electronic, electromagnetic, optical or other signals capable of being received by communications interface 218. Signals 220 may be provided to communications interface via a channel 222. Channel 222 carries signals 220 and may be implemented using wire or cable, fiber optics, a phone line, a cellular phone link, an RF link and/or any other suitable communications channels. For example, information handling system 100 includes at least one memory 204 operable to store computer-executable instructions, at least one communications interface 202, 218 to access the at least one memory 204; and at least one processor 200 configured to access the at least one memory 204 via the at least one communications interface 202, 218 and execute computer-executable instructions.

In this document, the terms "computer program medium" and "computer usable medium" are used to generally refer to media such as removable storage unit 212, a hard disk installed in hard disk drive 208, and signals 220. These computer program products may provide software to information handling system 100.

Computer programs (also called computer control logic) may be stored in main memory 204 and/or secondary memory 206. Computer programs may also be received via communications interface 218. Such computer programs, when executed, enable information handling system 100 to perform the features of the example embodiments as discussed herein. In particular, the computer programs, when executed, enable processor 200 to perform the features of the example embodiments. Accordingly, such computer programs represent controllers of information handling system 100.

In examples with software implementation, the software may be stored in a computer program product and loaded into information handling system 100 using removable storage drive 210, hard disk drive 208 or communications interface 218. The control logic (software), when executed by processor 200, causes processor 200 to perform the functions of the example embodiments as described herein.

In examples with hardware implementation, hardware components such as application specific integrated circuits (ASICs). Implementation of such a hardware state machine so as to perform the functions described herein will be apparent to persons skilled in the relevant art(s). It should be noted that the disclosure may be implemented at least partially on both hardware and software.

The preceding description provides various examples of the systems and methods of use disclosed herein which may [discuss during meeting]

Figure 3:
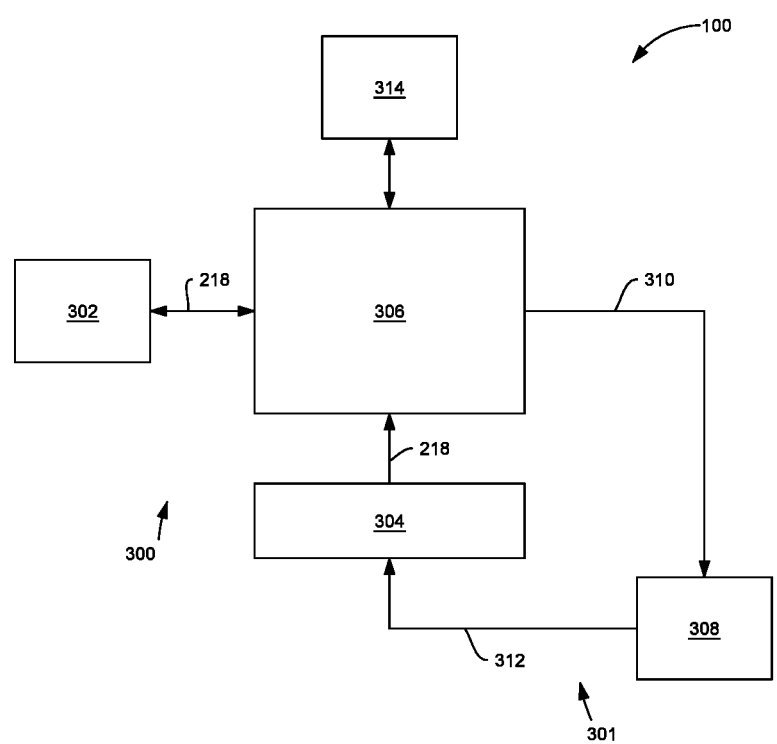
FIG. 3 illustrates a control system with a single well site.

FIG. 3 illustrates a control system 300 that integrates human inputs and electronic sensory inputs which are compiled to generate outputs that directly control electro-mechanical machinery for well construction operations. Control system 300 may convert a field development planning scenario into a well plan that is then converted into machine instructions, which may be upscaled and/or downscaled in an interactive feedback loop. A field development plan is defined as a geoscience, engineering, and/or economics analysis that demonstrates anticipated commercial performance and viability of a given oil field. A field may include one or more well sites at which any suitable well operation may be performed. In examples, one or more scenarios may be prepared for a field development plan to represent the various uncertain parameters, variables, and events that may be found in the day to day operation at a well site.

A well plan is defined as a specific scenario that may contain information such as casing depth points, recommended mud weights, drilling parameters and expected formation tops. Equipment at the well site is programmed with these parameters and the well plan may serve a rubric in which all measurements and sensory readings may be compared. For example, one planed parameter may be a planned casing depth point which may provide the rig a depth to drill to. During operations, the drilling depth at that well site may be compared to the planned casing depth point. A timeline associated with the operation may also indicate if the well site operate is on schedule.

Based on completion rate compared to timelines and drilling parameters set by the well plan, the well plan may be upscaled or downscaled. Upscaling and downscaling refer to the granularity of the decision and that decision's impact on broader objectives of the field development plan. For example, if a well site is behind schedule, other well site operations may be downscaled. Likewise, if a well site operation may be able to perform more operations than previously determined, the well site operation may be upscaled. In examples, upscaling may be applied to activities at one or more well site location, which may optimize the oil field as a whole based on changes at a well site. This may allow the entire oil field to be captured in a dynamic field simulation so that individual well sites are not the highest level in the decision-making process, rather the oil field as a whole is optimized. Thus, no individual decision at a well site may reduce the oil field performance as a whole.

With continued reference to FIG. 3, an interactive feedback loop 301 is located between Control system 300 and the relevant equipment 308 (discussed below) used during well construction. Interactive feedback loop 301 includes a field development scenario on software program 306, which may be updated by equipment input 312 (discussed below) from information gathered by sensors attached to equipment 308. The software program may reference an archival database 314 which may include the original field flan, updates to the field plan, and the executed plan. Archival database 314 may include data points representing the state of the field operation including the state of equipment at various points during the field operation. Archival database 314 may also include data points which represent the evolution of the field development plan over time. Software program 306 may also utilize archival database 314 and historical data therein as an input in addition to real-time sensory inputs equipment 308. For example, bit sensors on a drill bit (not illustrated) may indicate excessive wear during drilling operations at a well site, which indicate a decrease in efficiency and that a bit trip is required. These sensor measurements are fed back to information handling system 100 as equipment inputs 312. It should be noted, that while information handling system 100 is referred to in this disclosure, information handling system 100 may be interchanged for offsite computing, off site storage, offsite networking, distributed computer, or a neural network. In examples, information handling system 100 may be remote and accessed over any suitable medium such as the world wide web, virtual private network, and/or the like. Comparing the equipment inputs 312 to the well plan, information handling system 100 may evaluate the economics of the options to continue drilling as is, to do a bit trip before continuing drilling or call the section target depth early (halt drilling activities) in view of historical data from archival database 314 and equipment inputs 312. These results may be presented to a field development strategist who then decides the course of action. A chosen course of action is then instructed by information handling system 100 to by outputs through communication channel 310 (discussed below) to command equipment 308 at a well site.

With continued reference to FIG. 3, a field development strategist may make decisions regarding the field development plan utilizing a human interface 302. Human interface 302 may be any suitable electronic device that may allow for the communication of commands from human interface 302 to information handling system 100. The electronic device may be mobile and/or stationary and further may be able to receive information from information handling system 100. Without limitation, human interface 302 may facilitate back and forth communication between information handling system 100 and a field development strategist and/or any suitable personnel. From human interface 302, a field development strategist may control and/or manage control system 300.

Control system 300 is a mixture of software and hardware systems that are proposed to reduce human decision gates and activities. Human related decision gates and activities will be replaced by control loops that connect directly to the electro-mechanical machinery performing well construction operations. Without limitation, well construction operations may include drilling, tripping, running, logging, cementing, hydraulic fracturing or any other activities that may be required to construct a well as designed or work over an existing wellbore.

In examples, control system 300 may operate as follows, decisions made by personnel within human interface 302 may be input into information handling system 100 by communication interface 218. These decisions may be made in regard to a well plan and/or a field development plan. As illustrated, decisions made may be communicated through communication interface 218, which may move commands from human interface 302 to information handling system 100 and may also allow pass information such as sensor information and current well plan and/or a field development plan information from information handling system 100 to human interface 302 for review by personnel.

Inputs from human interface 302 may be combined with electronic inputs 304. Like human interface 302, electronic inputs 304 may be feed into information handling system 100 by communication interface 218. Electronic inputs 304 in include, but are not limited to, economics, long term production, CAPEX, reducing NPT, executing a well plan, and well control. Without limitation, weight of these inputs is given by the different stakeholders, and varies parties value different metrics based on their role. In examples, petroleum economics refer to indicators commonly used in oil and gas projects such as net present value (NPV), profit to investment ratio and total cost of ownership (TCO). These parameters define the economic performance of a project, specifying money spent, money earned, inflation rates, royalties, etc. Additional electronic inputs 304 may include economics and long-term production are calculations input to the computer, such as CAPEX and NPT which may be directly linked to cost spent where CAPEX is Capital expenditures and NPT is non-productive time when the rig is off of critical path of well construction. These types of variables may form parameters for a well plan.

The well plan is how the well will be constructed and is pre-defined on software program 306. Within information handling system 100, both human interface 302 and electronic inputs 304 may be proceed together by software program 306. Software program 306 may produce outputs, such as control instructions, that may be relayed to equipment 308. Instructions may be communicated using communication channel 310. Communication channel 310 may be wireless and/or wired. Without limitation, information handling system 100 may be stationed off the well construction site, which may allow personnel to control equipment 308 from a remote location.

Equipment 308 receives the plan from software program 306 and executes it. Software program 306 may optimize all parameters to yield the best economic outcome for a wellsite or a field. During execution of the well plan, a feedback loop may be formed by equipment inputs 312, where the rig sensors register information and measurements with software program 306 to update the economic calculations in the field development plan. Based on the output form the calculations software program 306 sends the information to the field development strategist through human interface 302 for review. Based on the information the field development strategist may make a decision to send a changed well plan to the rig directly.

Equipment 308 that may be controlled by outputs from information handling system 100 may include, but are not limited to, a hoisting system, a pumping system, a solids control equipment, a top-drive or rotary table, and/or the like. Each system may be found at any well site and may perform any function or operation from commands transmitted by information handling system 100.

Figure 4:
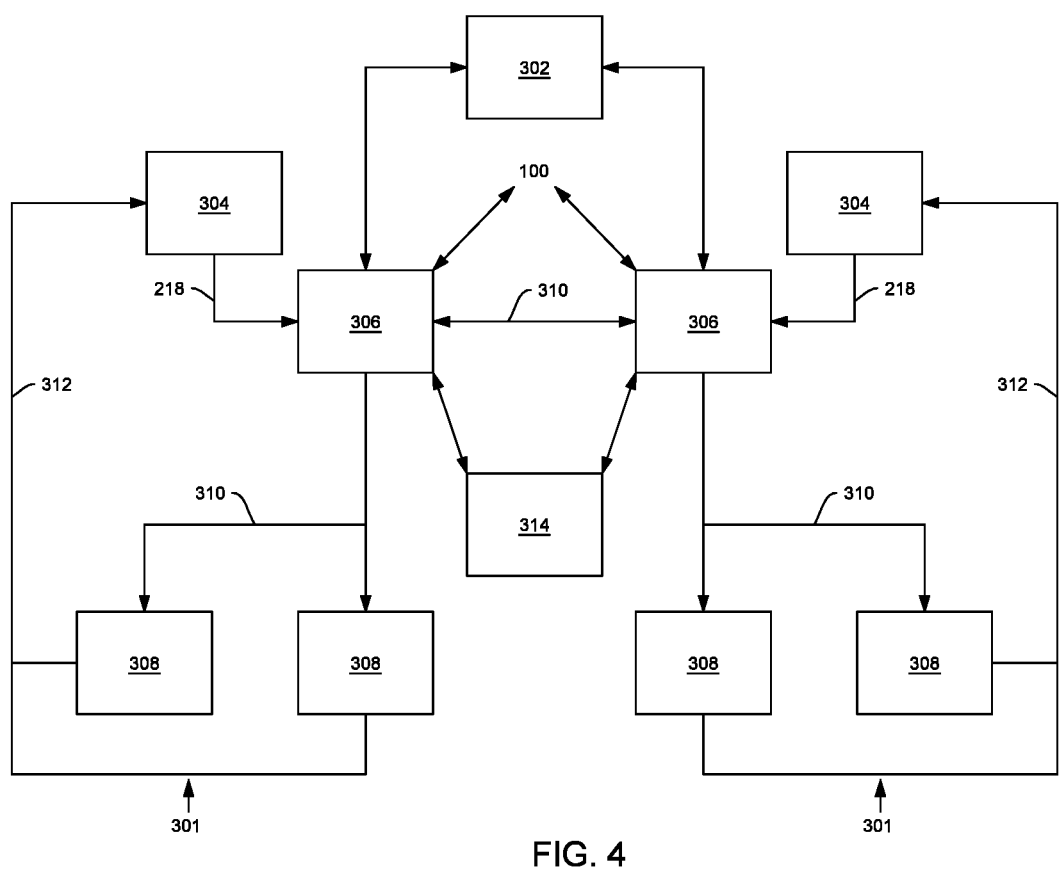
FIG. 4 illustrates a control system with a plurality of well sites.

FIG. 4 illustrates a control system 300 that integrates human inputs and electronic sensory inputs which are compiled to generate outputs that directly control electro-mechanical machinery for well construction operations over any number of well sites of an oil laden filed. As illustrates in FIG. 4, human interface 302 may be in communication with any number of information handling systems 100, which may include software program 306. Software program 306 may take inputs from electronic inputs 304 and human interface 302 through communication interface 218 and determine outputs for controlling one or more pieces of equipment 308 at one or more well sites through communication channel 310. Software program 306 may communicate with archival database 314 may include data points representing the state of the field operation including the state of equipment at various points during the field operation. Archival database 314 may also include data points which represent the evolution of the field development plan over time. Software program 306 may also utilize archival database 314 and historical data therein as an input in addition to real-time sensory inputs equipment 308. As illustrated, each of the information handling systems 100 may be connected by a communication channel 310, which may allow each of the information handling systems 100 to work together. As controlled by software program 306, each piece of equipment 308 may perform a function and/or operation. Sensors may take measurements and/or record information about the function and/or operation and send the information and/or measurements back to information handling system 100 as electronic inputs 304 through equipment inputs 312 to from interactive feedback loop 301. Software program 306 may take the updated sensory information and measurements and alter any of the one or more pieces of equipment at one or more well sites to complete the field development plan initiated at human interface 302.

Accordingly, the present disclosure may provide methods and systems for improving field development design, well planning and well construction activities. The methods and systems may include any of the various features disclosed herein, including one or more of the following statements.

Statement 1. A method comprising: inputting a field development plan into a human interface; transferring the field development plan to an information handling system; transferring one or more electronic inputs into the information handling system; running a software program on the information handling system that integrates the electronic inputs with the field development plan to produce an output; sending the output to one or more pieces of equipment; operating the one or more pieces of equipment based at least in part on the output; measuring the operation of the one or more pieces of equipment with one or more sensors; sending a measurement from the one or more sensors back to the information handling system; running the software program with the measurement; updating the output based at least in part on the measurement and the field development plan; and sending an updated output to the one or more pieces of equipment.

Statement 2. The method of statement 1, wherein there are more than one of the information handling system.

Statement 3. The method of any of statements 1-2, wherein the one or more pieces of equipment are located at one or more well sites.

Statement 4. The method of any of statements 1-3, wherein the one or more pieces of equipment are a hoisting system, a pumping system, a solids control, a top-drive, a rotary table or combinations thereof.

Statement 5. The method of any of statements 1-4, wherein the electronic inputs include at least one input selected from the group consisting of economics, long term production, capital expenditure, non-productive time, and combinations thereof.

Statement 6. The method of any of statements 1-5, further comprising sending the updated output to the human interface.

Statement 7. The method of statement 6, further comprising requesting approval of the updated output from an operator at the human interface.

Statement 8. The method of any of statements 1-7, further comprising updating the field development plan from the human interface and an updated field development plan.

Statement 9. The method of statement 8, further comprising sending the updated field development plan to the information handling system.

Statement 10. The method of statement 9, further comprising sending an updated output based at least in part on the updated field development plan to the one or more pieces of equipment.

Statement 11. A system comprising: a human interface configured to input and control a field development plan; an information handling system in communication with the human interface and wherein the information handling system includes a software program; and one or more pieces of equipment in communication with the information handling system.

Statement 12. The system of statement 11, wherein the information handling system is configured to run the field development plan.

Statement 13. The system of statement 12, wherein the information handling system is further configured integrate one or more electronic inputs with the field development plan to produce an output.

Statement 14. The system of statement 13, wherein the information handling system is further configured to send to the output to the one or more pieces of equipment.

Statement 15. The system of statement 14, wherein the one or more pieces of equipment are configured to operate based at least in part on the output.

Statement 16. The system of any of statements 11-15 further comprising a plurality of information handling systems, wherein each of the plurality of information handling systems are connected by one or more communication channels.

Statement 17. The system of any of statements 11-16, further comprising one or more well sites.

Statement 18. The system of claim 17, wherein the one or more pieces of equipment are located at each of the one or more well sites.

Statement 19. The system of any of statements 11-18, wherein the information handling system is configured do downscale the field development plan based at least in part on one or more measurements from one or more sensors on the one or more pieces of equipment.

Statement 20. The system of any of statements 11-19, wherein the information handling system is configured do upscale the field development plan based at least in part on one or more measurements from one or more sensors on the one or more pieces of equipment.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    inputting a field development plan into a human interface;
    transferring the field development plan to one or more information handling systems;
    transferring one or more electronic inputs into the information handling system;
    running a software program on the information handling system that integrates the electronic inputs with the field development plan to produce an output;
    sending the output to one or more pieces of equipment;
    operating the one or more pieces of equipment based at least in part on the output;
    measuring the operation of the one or more pieces of equipment with one or more sensors;
    sending a measurement from the one or more sensors back to the information handling system;
    running the software program with the measurement;
    updating the output based at least in part on the measurement and the field development plan; and
    sending an updated output to the one or more pieces of equipment.

2. The method of claim 1, wherein the one or more pieces of equipment are located at one or more well sites.

3. The method of claim 1, wherein the one or more pieces of equipment are a hoisting system, a pumping system, a solids control, a top-drive, a rotary table or combinations thereof.

4. The method of claim 1, wherein the electronic inputs include at least one input selected from the group consisting of economics, long term production, capital expenditure, non-productive time, and combinations thereof.

5. The method of claim 1, further comprising sending the updated output to the human interface.

6. The method of claim 5, further comprising requesting approval of the updated output from an operator at the human interface.

7. The method of claim 1, further comprising updating the field development plan from the human interface and an updated field development plan.

8. The method of claim 7, further comprising sending the updated field development plan to the information handling system.

9. The method of claim 8, further comprising sending an updated output based at least in part on the updated field development plan to the one or more pieces of equipment.

* * * * *